United States Patent
Grovlen et al.

(10) Patent No.: US 8,411,627 B2
(45) Date of Patent: Apr. 2, 2013

(54) METHOD AND APPARATUS FOR PROVIDING CONTROL CHANNELS FOR BROADCAST AND PAGING SERVICES

(75) Inventors: Asbjorn Grovlen, Frederiksberg (DK); Tsuyoshi Kashima, Tokyo (JP); Jarkko Tuomo Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 338 days.

(21) Appl. No.: 12/599,176

(22) PCT Filed: May 7, 2008

(86) PCT No.: PCT/IB2008/001137
§ 371 (c)(1),
(2), (4) Date: Aug. 4, 2010

(87) PCT Pub. No.: WO2008/135853
PCT Pub. Date: Nov. 13, 2008

(65) Prior Publication Data
US 2011/0069667 A1    Mar. 24, 2011

Related U.S. Application Data

(60) Provisional application No. 60/916,465, filed on May 7, 2007.

(51) Int. Cl.
*H04W 72/04* (2009.01)
(52) U.S. Cl. .......................... 370/329; 370/431
(58) Field of Classification Search .................. 370/329, 370/431, 468
See application file for complete search history.

(56) References Cited

U.S. PATENT DOCUMENTS

| | | | |
|---|---|---|---|
| 2008/0051084 A1* | 2/2008 | Casati et al. | 455/435.1 |
| 2008/0089285 A1* | 4/2008 | Pirskanen et al. | 370/329 |
| 2008/0159323 A1* | 7/2008 | Rinne et al. | 370/431 |
| 2008/0165755 A1* | 7/2008 | Marinier et al. | 370/342 |
| 2008/0188220 A1* | 8/2008 | DiGirolamo et al. | 455/434 |
| 2008/0259855 A1* | 10/2008 | Yoon et al. | 370/329 |

FOREIGN PATENT DOCUMENTS

| | | |
|---|---|---|
| WO | 02054685 A1 | 7/2002 |
| WO | 03019960 A1 | 3/2003 |

OTHER PUBLICATIONS

Office Action received in corresponding Korean Application No. 2009-7025443, dated Oct. 12, 2011. 3 pages.
Office Action received in corresponding Mexican Application No. MX/a/2009/011872, dated Oct. 13, 2011. 6 pages.

(Continued)

*Primary Examiner* — Brian D Nguyen
(74) *Attorney, Agent, or Firm* — Mintz, Levin, Cohn, Ferris, Glovsky & Popeo, PC

(57) ABSTRACT

An approach is provided to support resource allocation of broadcast or paging control channels. It is determined whether resource is allocated for a logical control channel. One or more fields of a physical downlink control channel is defined to signal the resource allocation for the logical control channel. The physical downlink control channel has a first format to support transmission of data over a downlink channel, and a second format that includes the one or more fields to support allocation of the logical control channel.

30 Claims, 12 Drawing Sheets

OTHER PUBLICATIONS

Ericsson, NTT DOCOMO: "R1-060573, E_UTRA Downlink Control Signaling—Overhead Assessment" 3GPP TSG RAN WG1 Meeting 44, [Online] Feb. 13, 2006-Feb. 17, 2007, pp. 1-7, XP002495528.

International Search Report mailed on Sep. 15, 2008, for corresponding PCT Application No. PCT/IB2008/001137, 41 pages.

Ericsson, NTT DOCOMO: "R1-060573, E-UTRA Downlink Control Signaling—Overhead Assessment", 3GPP TSG RAN WG1 Meeting 44, [Online], Feb. 13, 2006 pp. 1-7, retrieved from the internet: URL: http:/www.3gpp.org/ftp/tsg_ran/WG1_RL1/TSGR1-44/Docs/. [retrieved on Aug. 4, 2010].

Office action received for corresponding Korean Patent Application No. 2009-7025443, dated Feb. 11, 2011, 4 pages of Office Action, and 4 pages of Office Action translation.

"3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", 3GPP TR 25.813 v7.1.0, Sep. 2006, pp. 1-41.

"3rd Generation Partnership Project; Technical Specification Group Radio Access Network; Physical Layer Aspects for Evolved UTRA (Release 7)", 3GPP TR 25.814, v1.5.0, May 2006, pp. 1-125.

"3rd Generation Partnership Project; Technical Specification Group Services and System Aspects; 3GPP System Architecture Evolution: Report on Technical Options and Conclusions (Release 8)", 3GPP TR 23.882, v8.0.0, Sep. 2008, pp. 1-234.

"3rd Generation Partnership Project; Technical Specification Group Radio Access Network; Evolved Universal Terrestrial Access Network (E-UTRAN); X2 data transport (Release 8)",3GPP TS 36.424, v8.5.0, Mar. 2009, pp. 1-8.

International Preliminary Report on Patentability received for corresponding Patent Cooperation Treaty Application No. PCT/IB2008/001137, dated Nov. 10, 2009, 7 pages.

Office Action received in corresponding Korean Application No. 2009-7025443, dated Oct. 12, 2011. 6 pages.

* cited by examiner

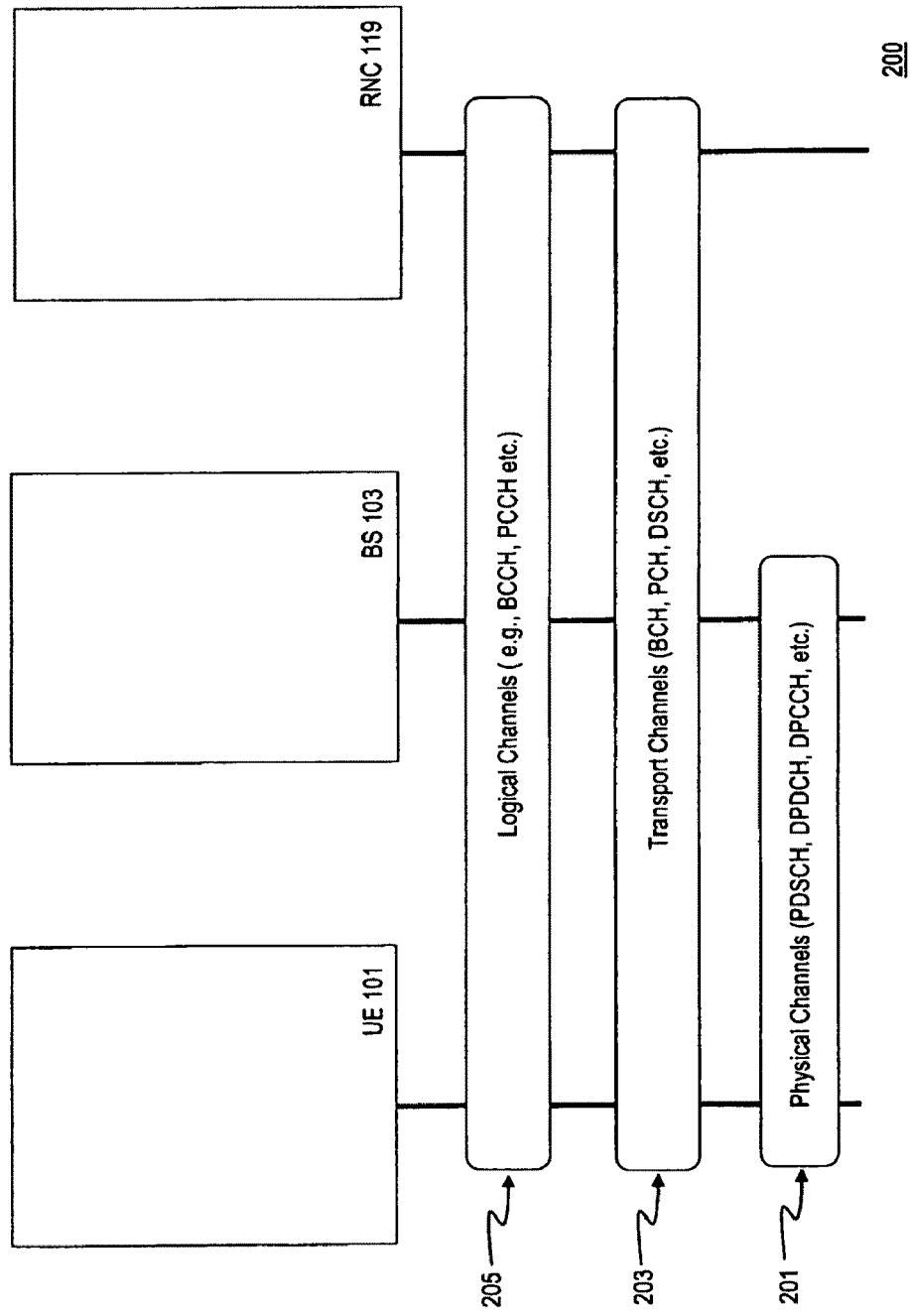

FIG. 4A

| Downlink Signaling Entry | |
|---|---|
| Name of the Identity | Effective Length [bit] |
| Identification (C-RNTI) | 16 |
| Error Detection (CRC) | {0, 8} |
| Physical Resource Block Allocation Indicator | Configurable |
| Transport Format Indicator | 5 |
| HARQ control | 5 |

| PDCCH Format For BCCH | |
|---|---|
| Name of the Identity | Effective Length [bit] |
| Identification (BCCH-RNTI) | 16 |
| Error Detection (CRC) | {0, 8} |
| Physical Resource Block Allocation Indicator | Configurable |
| Transport Format Indicator | 0 or 1 |
| Value tag | 4 |
| SIB type | Configurable |
| Segmentation/Concatenation information | Configurable |

403

METHOD AND APPARATUS FOR PROVIDING CONTROL CHANNELS FOR BROADCAST AND PAGING SERVICES

RELATED APPLICATION

This application was originally filed as PCT Application No. PCT/IB2008/001137 filed May 7, 2008, which claims priority to U.S. Provisional Application No. 60/916,465 filed May 7, 2007.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves resource allocation, and the control signaling to support such allocation. Traditionally, different channel formats are utilized to perform resource allocations for different services (e.g., broadcast, paging, etc.), thereby incurring unnecessary overhead.

SOME EXEMPLARY EMBODIMENTS

Therefore, there is a need for an approach for providing efficient signaling, which can co-exist with already developed standards and protocols.

According to one embodiment of the invention, a method comprises determining whether resource is allocated for a logical control channel that includes either a broadcast control channel or a paging control channel. The method also includes defining one or more fields of a physical downlink control channel to signal the resource allocation for the logical control channel. The physical downlink control channel has a first format to support transmission of data over a downlink channel, and a second format including the one or more fields to support allocation of the logical control channel.

According to another embodiment of the invention, an apparatus comprises logic configured to determine whether resource is allocated for a logical control channel that includes either a broadcast control channel or a paging control channel, and to define one or more fields of a physical downlink control channel to signal the resource allocation for the logical control channel. The physical downlink control channel has a first format to support transmission of data over a downlink channel, and a second format including the one or more fields to support allocation of the logical control channel.

According to another embodiment of the invention, a method comprises receiving a control message over a logical control channel that includes either a broadcast control channel or a paging control channel. The control message has a first format to provide resource allocation for the logical control channel using a physical downlink control channel, and a second format to support transmission of data over the physical downlink control channel.

According to yet another embodiment of the invention, an apparatus comprises logic configured to receive a control message over a logical control channel that includes either a broadcast control channel or a paging control channel. The control message has a first format to provide resource allocation for the logical control channel using a physical downlink control channel, and a second format to support transmission of data over the physical downlink control channel.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2 is a diagram of communication system capable of providing resource allocation in support of a broadcast and/or paging service, according to various embodiments of the invention;

FIGS. 4A-4C are diagrams of, respectively, a conventional PDCCH (Physical Downlink Control Channel) format, a PDCCH format for broadcast, and a PDCCH format for paging, according to various exemplary embodiments of the invention;

DESCRIPTION OF PREFERRED EMBODIMENTS

An apparatus, method, and software for providing a physical control channel for broadcast and/or paging services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with a Third Generation Partnership Project (3GPP) Long Term Evolution (LTE) architecture, it is recognized by one of ordinary skill in the art that the embodiments of the inventions have applicability to any type of communication system and equivalent functional capabilities.

Figure 1:
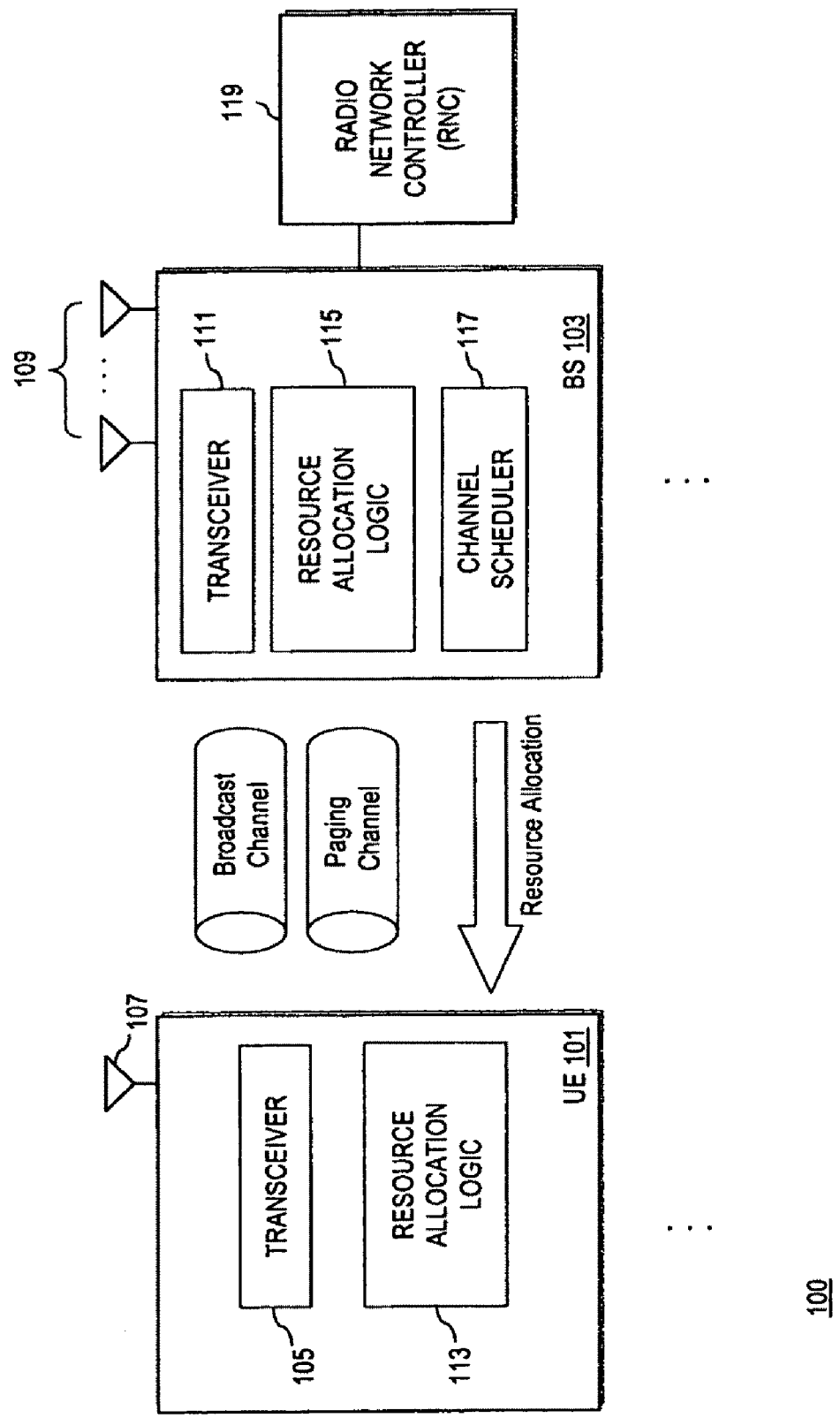
FIG. 1 is a diagram of communication system capable of providing resource allocation in support of a broadcast and/or paging service, according to various embodiments of the invention.

FIG. 1 is a diagram of communication systems capable of providing resource allocation, according to various embodiments of the invention. As shown in FIG. 1, one or more user equipment (UEs) 101 communicate with a base station 103, which is part of an access network (e.g., 3GPP LTE (or E-UTRAN, etc.). Under the 3GPP LTE architecture (as shown in FIGS. 6A-6D), the base station 103 is denoted as an enhanced Node B (eNB). The UE 101 can be any type of mobile stations, such as handsets, terminals, stations, units, devices, multimedia tablets, Internet nodes, communicators, Personal Digital Assistants or any type of interface to the user (such as "wearable" circuitry, etc.). The UE 101 includes a transceiver 105 and an antenna system 107 that couples to the transceiver 105 to receive or transmit signals from the base station 103. The antenna system 107 can include one or more antennas.

As with the UE 101, the base station 103 employs a transceiver 111, which transmits information to the UE 101. Also, the base station 103 can employ one or more antennas 109 for transmitting and receiving electromagnetic signals. For instance, the Node B 103 may utilize a Multiple Input Multiple Output (MIMO) antenna system 109, whereby the Node B 103 can support multiple antenna transmit and receive capabilities. This arrangement can support the parallel transmission of independent data streams to achieve high data rates between the UE 101 and Node B 103. The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GPP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

The system 100 supports resource allocation for broadcast and paging services. The mobile station 101 employs resource allocation logic 113 to request resources from the network. On the network side, the base station 103 provides resource allocation logic 115 to grant resources for a communication link with the mobile station 101. The communication link, in this example, involves the downlink, which supports traffic from the network to the user. Once the resource is allocated, data transmission can commence, whereby a channel scheduler 117 can regulate the data transmission to the UE 101.

In this example, the allocated resources involve physical resource blocks (PRB), which correspond to OFDM symbols, to provide communication between the UE 101 and the base station 103. That is, the OFDM symbols are organized into a number of physical resource blocks (PRB) that includes consecutive sub-carriers for corresponding consecutive OFDM symbols. To indicate which physical resource blocks (or sub-carrier) are allocated to a UE 101, two exemplary schemes include: (1) bit mapping, and (2) (start, length) by using several bits indicating the start and the length of an allocation block.

To ensure reliable data transmission, the system 100 of FIG. 1, in certain embodiments, uses concatenation of Forward Error Correction (FEC) coding and an Automatic Repeat Request (ARQ) protocol commonly known as Hybrid ARQ (HARQ). Automatic Repeat Request (ARQ) is an error detection mechanism using error detection logic (not shown). This mechanism permits the receiver to indicate to the transmitter that a packet or sub-packet has been received incorrectly, and thus, the receiver can request the transmitter to resend the particular packet(s). This can be accomplished with a Stop and Wait (SAW) procedure, in which the transmitter waits for a response from the receiver before sending or resending packets. The erroneous packets are used in conjunction with retransmitted packets.

It is recognized that conventional approaches do not adequately provide for allocating resources of a broadcast channel or paging channel. Within the LTE architecture, these channels are logical channels that are mapped onto physical channels. Conventional systems do not provide a channel format at the physical layer that can properly and efficiently signal information regarding the resource allocation for broadcast and paging services.

As shown in FIG. 1, a radio network controller (RNC) 119 communicates with the base station 103 to manage radio resources. In addition to radio resource management, the RNC 119 provides maintenance and operation of Radio Resource Control (RRC). According to one embodiment, the base station 103, as an eNB, can encompass the RNC functions, as shown in FIGS. 6A-6D.

FIG. 2 is a diagram of communication system capable of providing resource allocation in support of a broadcast and/or paging service, according to various embodiments of the invention. System 200 provides various channel types: physical channels 201, transport channels 203, and logical channels 205. In this example, the physical channels 201 are established between the UE 101 and the base station 103, and transport channels 203 and logical channels 205 are established among the UE 101, BS 103 and RNC 119. Physical channels 201 can include a physical downlink shared channel (PDSCH), a dedicated physical downlink dedicated channel (DPDCH), a dedicated physical control channel (DPCCH), etc.

The transport channels 203 can be defined by how they transfer data over the radio interface and the characteristics of the data. The transport channels 203 include a broadcast channel (BCH), paging channel (PCH), a dedicated shared channel (DSCH), etc. Other exemplary transport channels 203 are an uplink (UL) Random Access Channel (RACH), Common Packet Channel (CPCH), Forward Access Channel (FACH), Downlink Shared Channel (DSCH), Uplink Shared Channel (USCH), Broadcast Channel (BCH), and Paging Channel (PCH). A dedicated transport channel is the UL/DL Dedicated Channel (DCH). Each transport channel 203 is mapped to one or more physical channels 201 according to its physical characteristics.

Each logical channel 205 can be defined by the type and required Quality of Service (QoS) of information that it carries. The associated logical channels 205 include, for example, a broadcast control channel (BCCH), a paging control channel (PCCH), Dedicated Control Channel (DCCH), Common Control Channel (CCCH), Shared Channel Control Channel (SHCCH), Dedicated Traffic Channel (DTCH), Common Traffic Channel (CTCH), etc.

The BCCH (Broadcast Control Channel) can be mapped onto both BCH and DSCH. As such, this is mapped to the PDSCH; the time-frequency resource can be dynamically allocated by using L1/L2 control channel (PDCCH). In this case, BCCH (Broadcast Control Channel)-RNTI (Radio Network Temporary Identities) is used to identify the resource allocation information.

Similarly, PCH (Paging Channel) can be mapped onto the PDSCH. In this case, PCCH (Paging Control Channel)-RNTI could be used in PDCCH (Physical Downlink Control Channel) to identify the information of resource allocation over PDSCH.

Figure 4C:
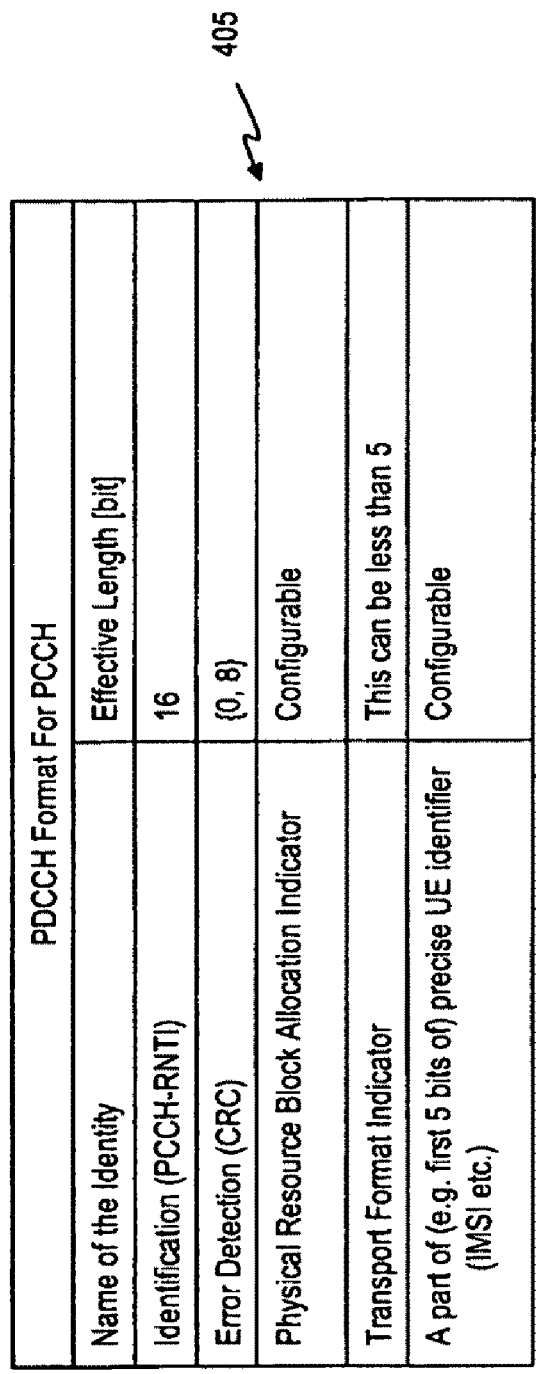

As will be explained below, the PDCCH formats can be modified to accommodate BCCH and PCH (as shown in FIGS. 4B and 4C).

FIGS. 3A-3D are flowcharts of processes for allocating resources for broadcast and paging services, according to various exemplary embodiments of the invention. By way of example, resource allocation is described with respect to a broadcast service or a paging service. As earlier described, logical channels, such as broadcast control channel and paging control channel, are supported by physical channels. To differentiate between channels that carry signaling information versus those channels that transport data, the term "control channel" is utilized. In step 301 of FIG. 3A, the process determines whether resources of a logical control channel are to be allocated; the logical control channel, in an exemplary embodiment, refers to either the broadcast control channel or the paging control channel. Such allocation information is relayed to the UE 101 using a physical channel, e.g., physical downlink control channel (PDCCH). The format of this physical control channel is redefined, as in step 303, to accommodate specifying resource allocation for the logical control channel. Next, the process utilizes the redefined format for the resource allocation of the broadcast control channel or the paging control channel (step 305).

Figure 3A:
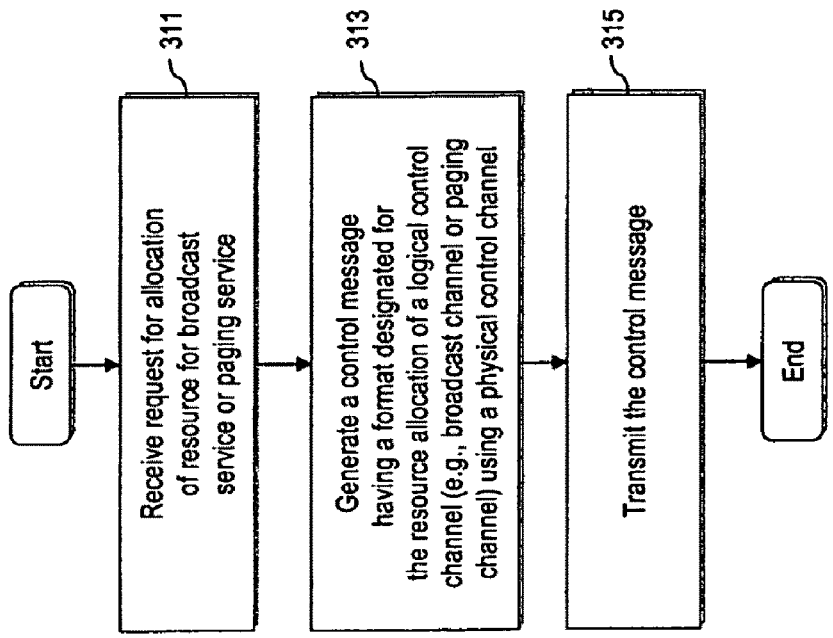
FIGS. 3A-3D are flowcharts of processes for allocating resources for broadcast and paging services, according to various exemplary embodiments of the invention.
Figure 3B:
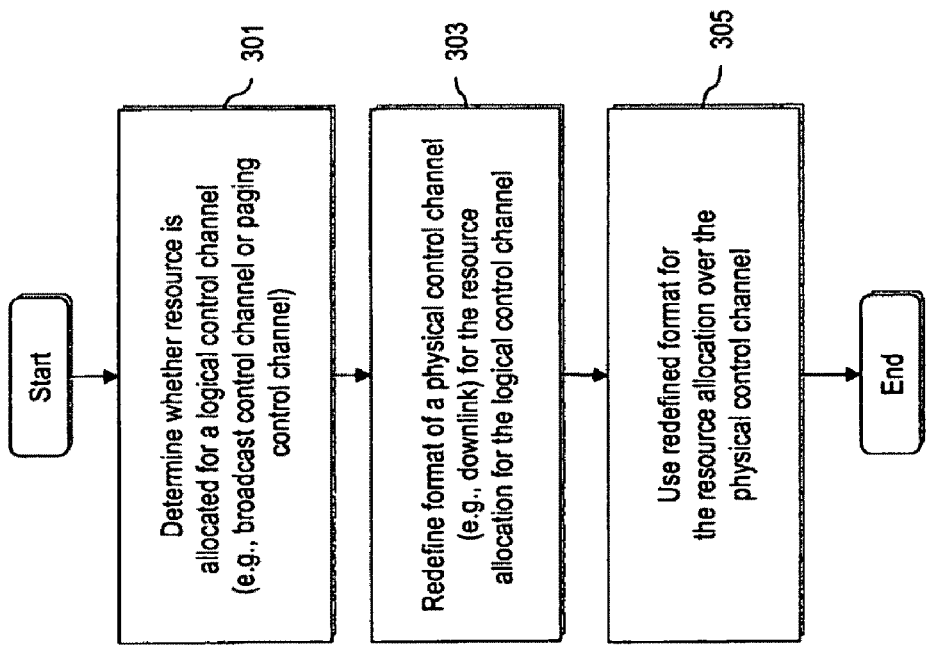

As shown in FIG. 3B, in step 311, the base station 103, for example, receives a request for resources associated with a broadcast or paging service. A control message is generated, per step 313, according to a format designated for resource allocation of a logical control channel using a physical control channel (e.g., PDCCH); this format is that redefined in the process of FIG. 3A. The control message is then transmitted to the UE 101, as in step 315.

On the receive side, a number of processes can occur that exploit the information conveyed by the redefined physical control channel. In one scenario, the format can provide reference signal boosting information by providing an appropriate field. Pilot (or reference) boosting can be performed by puncturing the carriers that are used for data; consequently, the UE 101 needs to have knowledge of such use. In FIG. 3C, the UE 101 receives, over the physical control channel, a control signal for allocation of a logical control channel, as in step 321. In step 323, the reference signal boosting field is examined to determine whether such boosting is employed. The UE 101 can thus have knowledge of how to decode the physical downlink channel (e.g., PDSCH). With this information, the UE 101 can selectively decode the PDSCH channel accordingly (step 325).

Figure 3D:
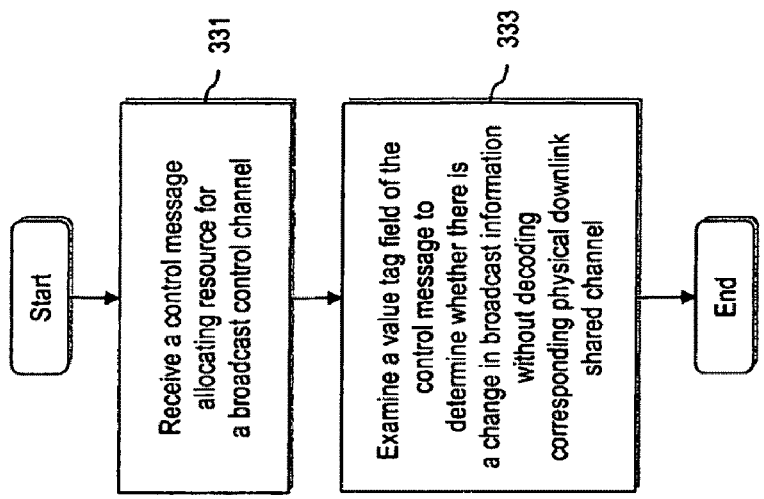
Figure 3C:
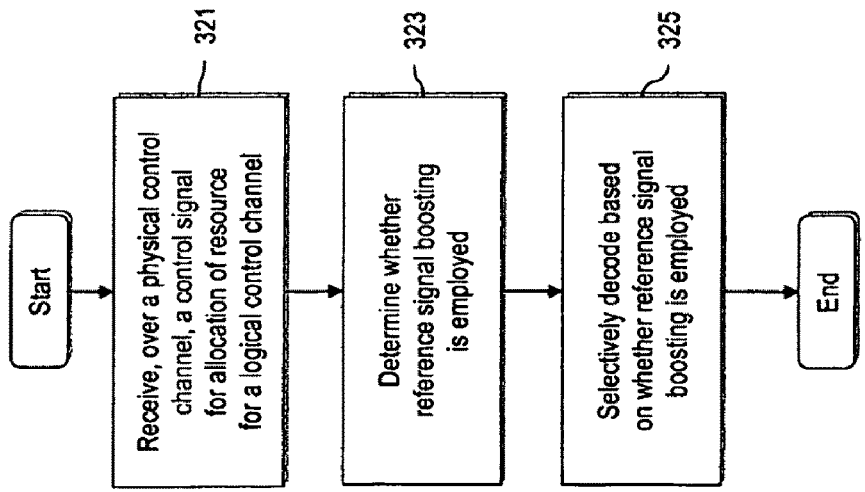

FIG. 3D illustrates a scenario in which a value tag field is defined in a broadcast service. For example, in step 331, the UE 101 receives a control message allocating resource for a broadcast control channel. The control message includes a value tag field that specifies whether there is a change in broadcast information without the need to decode the corresponding physical channel—e.g., PDSCH (step 333).

Exemplary formats of the physical control channel reconfigured or redefined for broadcast or paging service are detailed below.

FIGS. 4A-4C are diagrams of, respectively, a conventional PDCCH (Physical Downlink Control Channel) format, a PDCCH format for broadcast, and a PDCCH format for paging, according to various exemplary embodiments of the invention. FIG. 4A shows a conventional format 401 for providing resource allocation of normal downlink data, as defined in Table 1:

TABLE 1

| PDCCH format (Conventional) | |
|---|---|
| Field | Description |
| Name of the Identity Identification | Identifier Cell Radio Network Temporary Identity |
| Error Detection | Cyclic Redundancy Check (CRC) |
| Physical Resource Block Allocation Indicator | Specifies allocation of resources |
| Transport Format Indicator (TFI) | Specifies modulation and coding scheme (MCS) |
| HARQ control | Provides acknowledgement signaling in support of HARQ |

The above format 401 does not accommodate broadcast or paging services. Therefore, formats 403 and 405, shown in FIGS. 4B and 4C, respectively, are defined. Table 2 lists the description of the various fields for the PDCCH format 403 for the broadcast control channel resource allocation.

TABLE 2

| PDCCH format for BCCH | |
|---|---|
| Field | Description |
| Name of the Identity Identification | Identifier Broadcast Control Channel Radio Network Temporary Identity (BCCH-RNTI) |
| Error Detection | Cyclic Redundancy Check (CRC) |
| Physical Resource Block Allocation Indicator | Specifies allocation of resources |
| Transport Format Indicator (TFI) | Specifies modulation and coding scheme (MCS) |
| Value tag | Incremented upon change of system information |
| SIB type | System Information Block type |
| Segmentation/Concatenation information | For segmentation, 1 bit can be used to indicate whether other segments follow or not; For concatenation, length of system information block |

As for the paging service, the fields of format 405 are provided in Table 3, as follows.

TABLE 3

| PDCCH format for PCCH | |
|---|---|
| Field | Description |
| Name of the Identity Identification (PCCH-RNTI) | Identifier Physical Control Channel Radio Network Temporary Identity |
| Error Detection | Cyclic Redundancy Check (CRC) |
| Physical Resource Block Allocation Indicator | Specifies allocation of resources |
| Transport Format Indicator | Specifies modulation and coding scheme (MCS) |

TABLE 3-continued

PDCCH format for PCCH

| Field | Description |
|---|---|
| A part of precise UE identifier (IMSI etc.) | First 5 bits |

Even when PDCCH is used for BCCH or PCCH, the same amount of bits is available on PDCCH because the uniform structure of PDCCH is desirable. However, for BCCH and PCCH, the possible transport formats can be much less (e.g., 1 or 0 bits for TFI can be utilized), and HARQ control information is not necessary. It is noted that C-RNTI can be replaced by BCCH-RNTI and PCCH-RNTI, respectively. Further, it is recognized that some information is needed before decoding the PDSCH the first time by the UE 101. This information could be put on CCPCH, but this leads to a larger overhead than transmitting it on the PDCCH associated with a BCCH transmission mapped to DL-SCH as this is transmitted at a lower frequency.

When PDCCH is used for indicating the resource allocation of BCCH, some bit fields of the conventional PDCCH format 401 that is used for the resource allocation of DL data can be modified as follows. For example, the whole or a part of TFI field can be redefined, as well as the HARQ control field can be redefined. For BCCH (shown in FIG. 4B), BCCH-RNTI can be used in place of C-RNTI. According to various embodiments, several types of BCCH-RNTI can be defined; thus, the contents of BCCH need to be indicated—e.g., a value tag may be replaced by allocating several BCCH-RNTI to one SIB or SU (Scheduling Unit). Also, different BCCH-RNTI could, for example, indicate change in the SIB/SU or segment number.

In the redefined bit field, the value tag of the system information is provided. In an exemplary embodiment, the value tag has a length of 4 bits. The value is incremented when the system information contents are changed to indicate the change to UEs.

Also, the modified format can indicate information of segmentation and concatenation; such format is open. For example, for segmentation, 1 bit is used to indicate whether other segments follow or not. For concatenation, the length of system information block can be specified.

Further, the type of system information block can be indicated in the modified format. Because the use of different BCCH-RNTIs for different SIBs could increase the PDCCH processing load of an UE 101, one or a limited number of BCCH-RNTIs is used for all SIBs, according to one embodiment. In this case, the type of SIB can be indicated within the redefined field.

Furthermore, the modified channel format can specify the number of transmission symbols (e.g., OFDM symbols) used for Time Division Duplex (TDD) idle periods in the subframe containing the BCCH transmission. For example, up to 5 symbols can be taken for generating the idle periods.

In addition, the modified PDCCH format can indicate whether reference signal boosting is employed. When pilot boosting is utilized, e.g., by puncturing carriers used for data, the UE 101 is made aware of this before the UE 101 attempts to decode the PDSCH (as discussed in FIG. 3C).

To support paging service, the conventional PDCCH format can be modified to specify the resource allocation of the PCCH (Table 3; FIG. 4C). For example, a part of the TFI field can be redefined (e.g., a shorter TFI can be used). Additionally, the HARQ control filed can be redefined. PCCH-RNTI is used in place of C-RNTI. There can be several types of PCCH-RNTI, as to correspond to different paging groups. In the redefined field, a part of precise UE identifier (e.g., IMSI etc.) that is to be included in PCH can be specified. By checking this field, not all UEs 101 that decode the PDCCH need to decode the PCH.

It is noted that reuse of the PDCCH information bits is not limited to above mentioned examples. That is, the PDCCH information can be reused whenever it is possible, e.g., in cases when BCCH or PCH uses PDCCH as the allocation method.

By redefining the bits on PDCCH to convey other information for broadcast and paging services, the radio resource can be utilized more efficiently. In other words, overhead can be reduced. As described above, by putting a value tag (change mark) in PDCCH for BCCH, the UE can know whether there has been any change in the broadcast information without decoding the corresponding PDSCH. By utilizing the same PDCCH format in all cases reduces implementation and testing efforts. In this manner, overhead can be reduced by putting information that is needed to decode the BCCH on the PDCCH rather than on the CCPCH.

One of ordinary skill in the art would recognize that the processes for providing resource allocation for broadcast and paging services may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 5.

Figure 5:
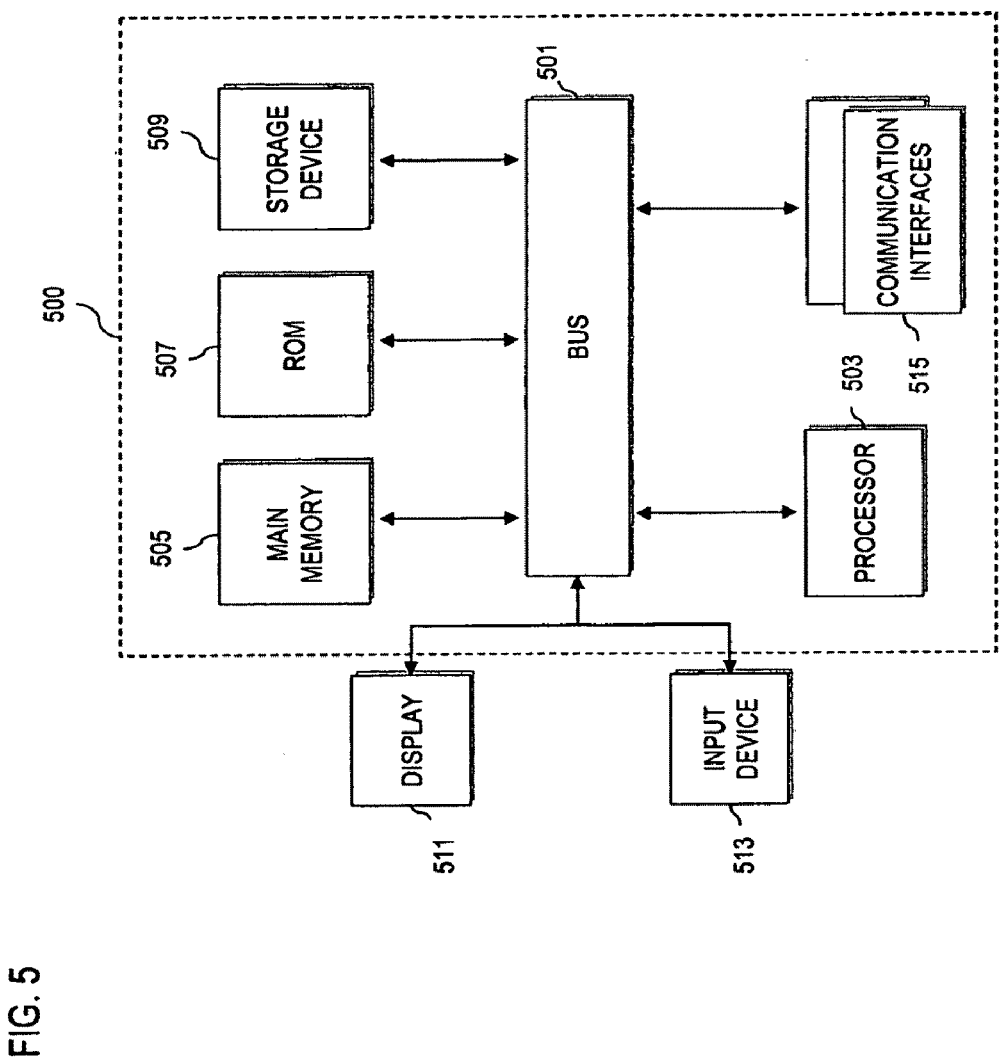
FIG. 5 is a diagram of hardware that can be used to implement an embodiment of the invention.

FIG. 5 illustrates exemplary hardware upon which various embodiments of the invention can be implemented. A computing system 500 includes a bus 501 or other communication mechanism for communicating information and a processor 503 coupled to the bus 501 for processing information. The computing system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computing system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computing system 500 may be coupled with the bus 501 to a display 511, such as a liquid crystal display, or active matrix display, for displaying information to a user. An input device 513, such as a keyboard including alphanumeric and other keys, may be coupled to the bus 501 for communicating information and command selections to the processor 503. The input device 513 can include a cursor control, such as a mouse, a trackball, or cursor direction keys, for communicating direction information and command selections to the processor 503 and for controlling cursor movement on the display 511.

According to various embodiments of the invention, the processes described herein can be provided by the computing system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 500 also includes at least one communication interface 515 coupled to bus 501. The communication interface 515 provides a two-way data communication coupling to a network link (not shown). The communication interface 515 sends and receives electrical, electromagnetic, or optical signals that carry digital data streams representing various types of information. Further, the communication interface 515 can include peripheral interface devices, such as a Universal Serial Bus (USB) interface, a PCMCIA (Personal Computer Memory Card International Association) interface, etc.

The processor 503 may execute the transmitted code while being received and/or store the code in the storage device 509, or other non-volatile storage for later execution. In this manner, the computing system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIGS. 6A-6D are diagrams of communication systems having exemplary long-term evolution (LTE) architectures, in which the user equipment (UE) and the base station of FIG. 1 can operate, according to various exemplary embodiments of the invention. By way of example (shown in FIG. 6A), a base station (e.g., destination node 103) and a user equipment (UE) (e.g., source node 101) can communicate in system 600 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

Figure 6A:
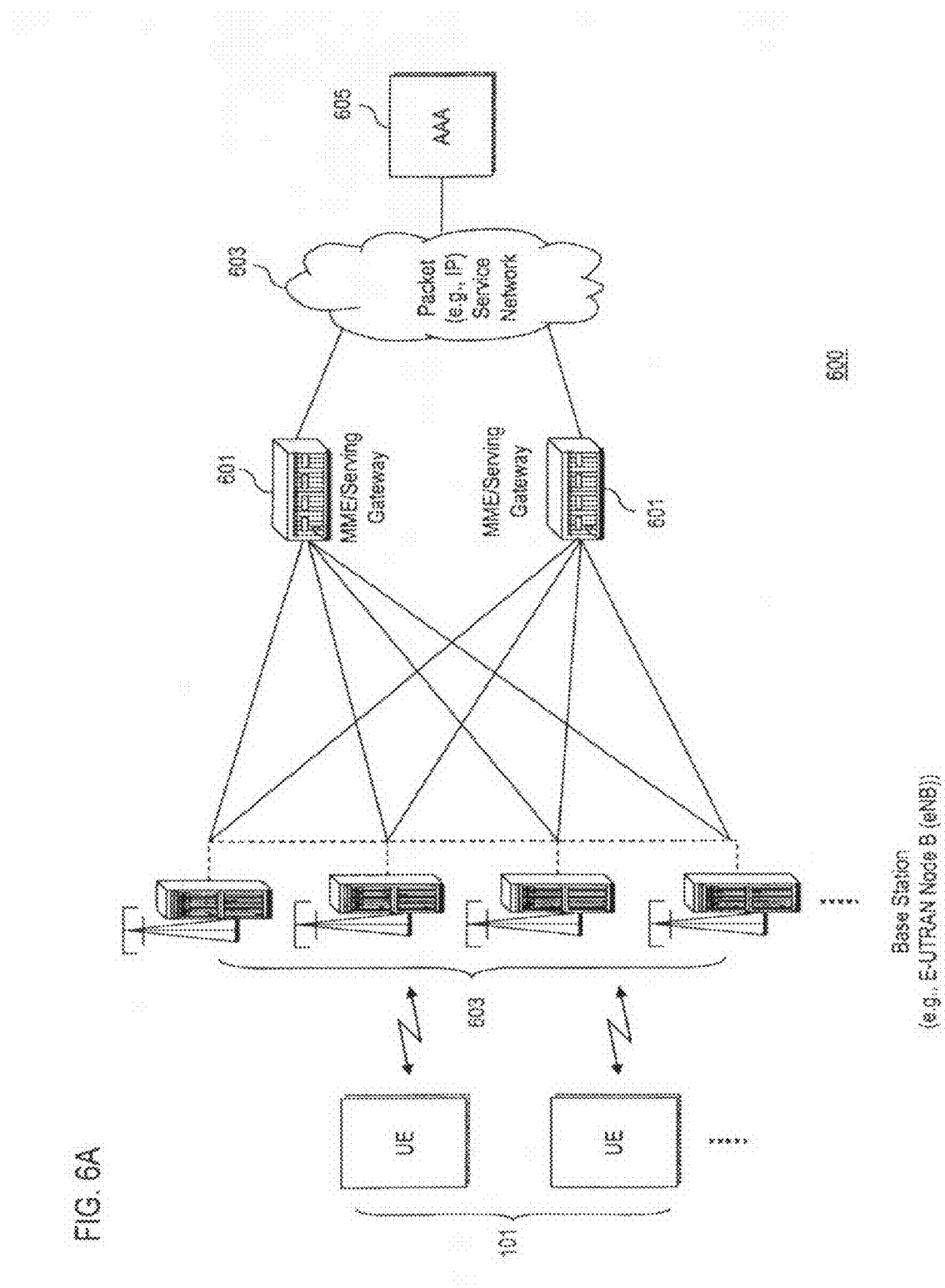
FIGS. 6A-6D are diagrams of communication systems having exemplary long-term evolution (LTE) and E-UTRA (Evolved Universal Terrestrial Radio Access) architectures, in which the system of FIG. 1 can operate to provide resource allocation, according to various exemplary embodiments of the invention.

The communication system 600 is compliant with 3GPP LTE, entitled "Long Term Evolution of the 3GPP Radio Technology" (which is incorporated herein by reference in its entirety). As shown in FIG. 6A, one or more user equipment (UEs) 101 communicate with a network equipment, such as a base station 103, which is part of an access network (e.g., WiMAX (Worldwide Interoperability for Microwave Access), 3GPP LTE (or E-UTRAN or 8.9G), etc.). Under the 3GPP LTE architecture, base station 103 is denoted as an enhanced Node B (eNB).

MME (Mobile Management Entity)/Serving Gateways 601 are connected to the eNBs 103 in a full or partial mesh configuration using tunneling over a packet transport network (e.g., Internet Protocol (IP) network) 603. Exemplary functions of the MME/Serving GW 601 include distribution of paging messages to the eNBs 103, termination of U-plane packets for paging reasons, and switching of U-plane for support of UE mobility. Since the GWs 601 serve as a gateway to external networks, e.g., the Internet or private networks 603, the GWs 601 include an Access, Authorization and Accounting system (AAA) 605 to securely determine the identity and privileges of a user and to track each user's activities. Namely, the MME Serving Gateway 601 is the key control-node for the LTE access-network and is responsible for idle mode UE tracking and paging procedure including retransmissions. Also, the MME 601 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 6B:
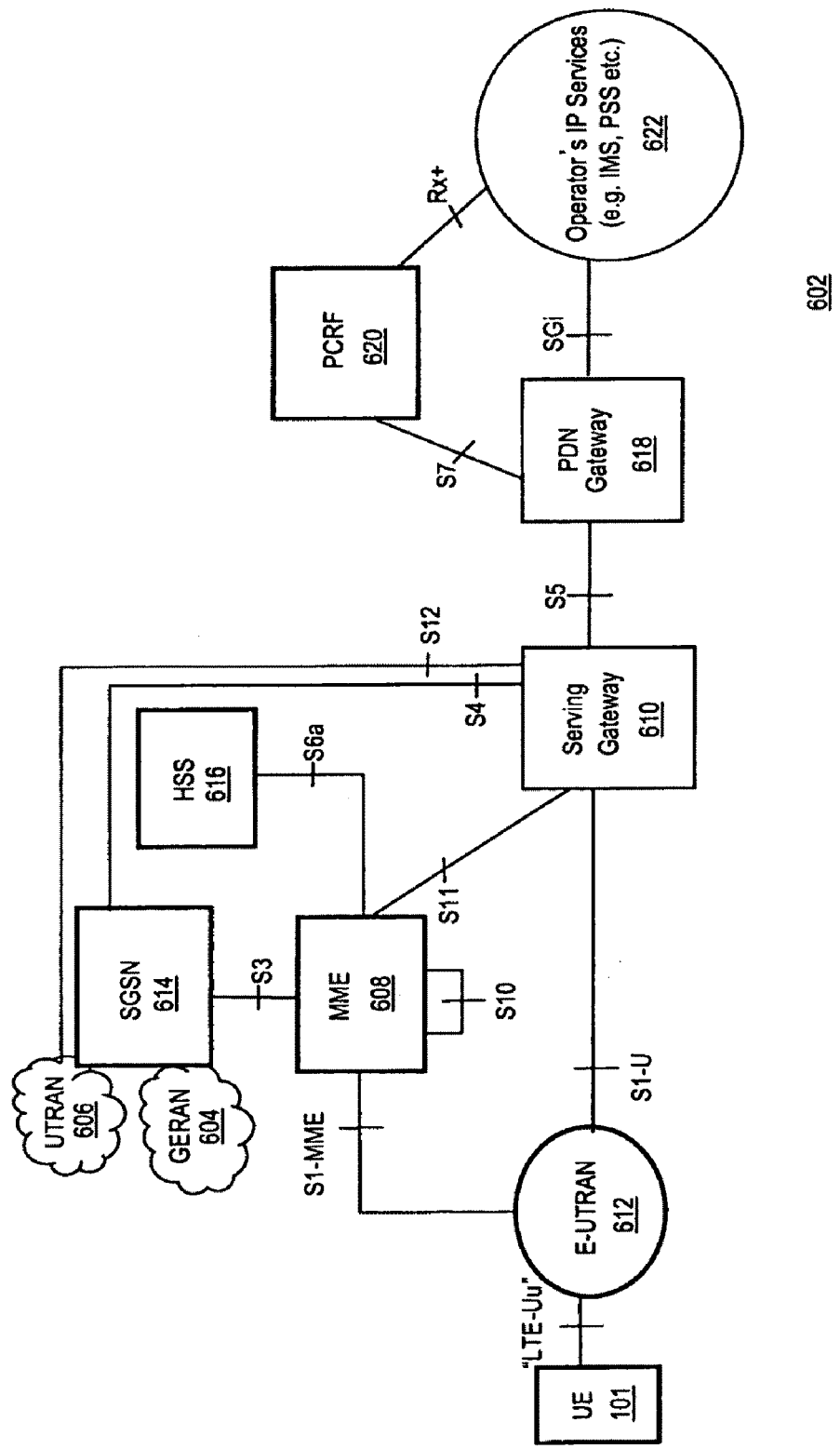

In FIG. 6B, a communication system 602 supports GERAN (GSM/EDGE radio access) 604, and UTRAN 606 based access networks, E-UTRAN 612 and non-3GPP (not shown) based access networks, and is more fully described in TR 23.882, which is incorporated herein by reference in its entirety. A key feature of this system is the separation of the network entity that performs control-plane functionality (MME 608) from the network entity that performs bearer-plane functionality (Serving Gateway 610) with a well defined open interface between them S11. Since E-UTRAN 612 provides higher bandwidths to enable new services as well as to improve existing ones, separation of MME 608 from Serving Gateway 610 implies that Serving Gateway 610 can be based on a platform optimized for signaling transactions. This scheme enables selection of more cost-effective platforms for, as well as independent scaling of, each of these two elements. Service providers can also select optimized topological locations of Serving Gateways 610 within the network independent of the locations of MMEs 608 in order to reduce optimized bandwidth latencies and avoid concentrated points of failure.

As seen in FIG. 6B, the E-UTRAN (e.g., eNB) 612 interfaces with UE 101 via LTE-Uu. The E-UTRAN 612 supports LTE air interface and includes functions for radio resource control (RRC) functionality corresponding to the control plane MME 608. The E-UTRAN 612 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 608, as a key control node, is responsible for managing mobility UE identifies and security parameters and paging procedure including retransmissions. The MME 608 is involved in the bearer activation/deactivation process and is also responsible for choosing Serving Gateway 610 for the UE 101. MME 608 functions include Non Access Stratum (NAS) signaling and related security. MME 608 checks the authorization of the UE 101 to camp on the service provider's Public Land Mobile Network (PLMN) and enforces UE 101 roaming restrictions. The MME 608 also provides the control plane function for mobility between LTE and 2G/3G access networks with the S3 interface terminating at the MME 608 from the SGSN (Serving GPRS Support Node) 614.

The SGSN 614 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 608 and HSS (Home Subscriber Server) 616. The S10 interface between MMEs 608 provides MME relocation and MME 608 to MME 608 information transfer. The Serving Gateway 610 is the node that terminates the interface towards the E-UTRAN 612 via S1-U.

The S1-U interface provides a per bearer user plane tunneling between the E-UTRAN 612 and Serving Gateway 610. It contains support for path switching during handover between eNBs 103. The S4 interface provides the user plane with related control and mobility support between SGSN 614 and the 3GPP Anchor function of Serving Gateway 610.

The S12 is an interface between UTRAN 606 and Serving Gateway 610. Packet Data Network (PDN) Gateway 618 provides connectivity to the UE 101 to external packet data networks by being the point of exit and entry of traffic for the UE 101. The PDN Gateway 618 performs policy enforcement, packet filtering for each user, charging support, lawful interception and packet screening. Another role of the PDN Gateway 618 is to act as the anchor for mobility between 3GPP and non-3GPP technologies such as WiMax and 3GPP2 (CDMA 1× and EvDO (Evolution Data Only)).

The S7 interface provides transfer of QoS policy and charging rules from PCRF (Policy and Charging Role Function) 620 to Policy and Charging Enforcement Function (PCEF) in the PDN Gateway 618. The SGi interface is the interface between the PDN Gateway and the operator's IP services including packet data network 622. Packet data network 622 may be an operator external public or private packet data network or an intra operator packet data network, e.g., for provision of IMS (IP Multimedia Subsystem) services. Rx+ is the interface between the PCRF and the packet data network 622.

Figure 6C:
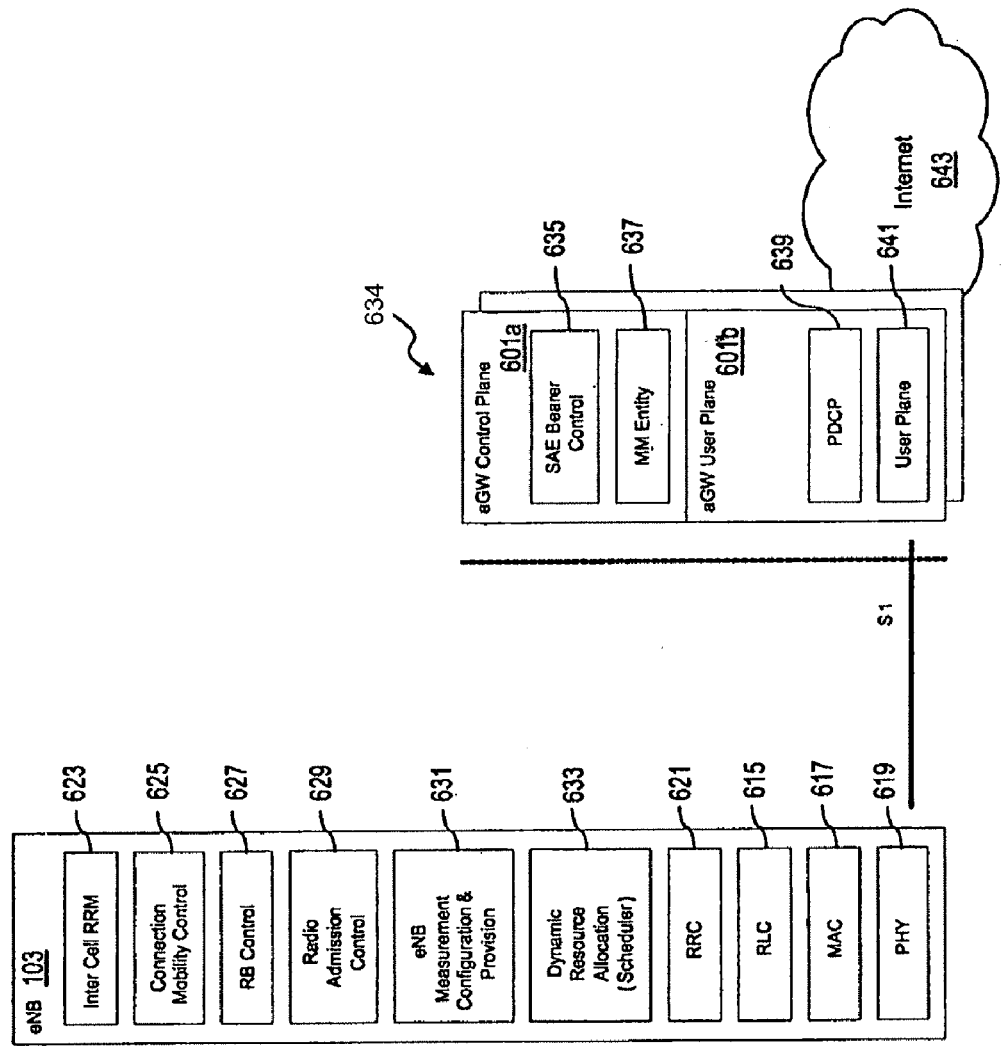

As seen in FIG. 6C, the eNB 103 utilizes an E-UTRA (Evolved Universal Terrestrial Radio Access) (user plane, e.g., RLC (Radio Link Control) 615, MAC (Media Access Control) 617, and PHY (Physical) 619, as well as a control plane (e.g., RRC 621)). The eNB 103 also includes the following functions: Inter Cell RRM (Radio Resource Management) 623, Connection Mobility Control 625, RB (Radio Bearer) Control 627, Radio Admission Control 629, eNB Measurement Configuration and Provision 631, and Dynamic Resource Allocation (Scheduler) 633.

The eNB 103 communicates with the aGW 634 (Access Gateway) via an S1 interface. The aGW 634 includes a User Plane 601a and a Control plane 601b. The control plane 601b provides the following components: SAE (System Architecture Evolution) Bearer Control 635 and MM (Mobile Management) Entity 637. The user plane 601b includes a PDCP (Packet Data Convergence Protocol) 639 and a user plane functions 641. It is noted that the functionality of the aGW 634 can also be provided by a combination of a serving gateway (SGW) and a packet data network (PDN) GW. The aGW 634 can also interface with a packet network, such as the Internet 643.

Figure 6D:
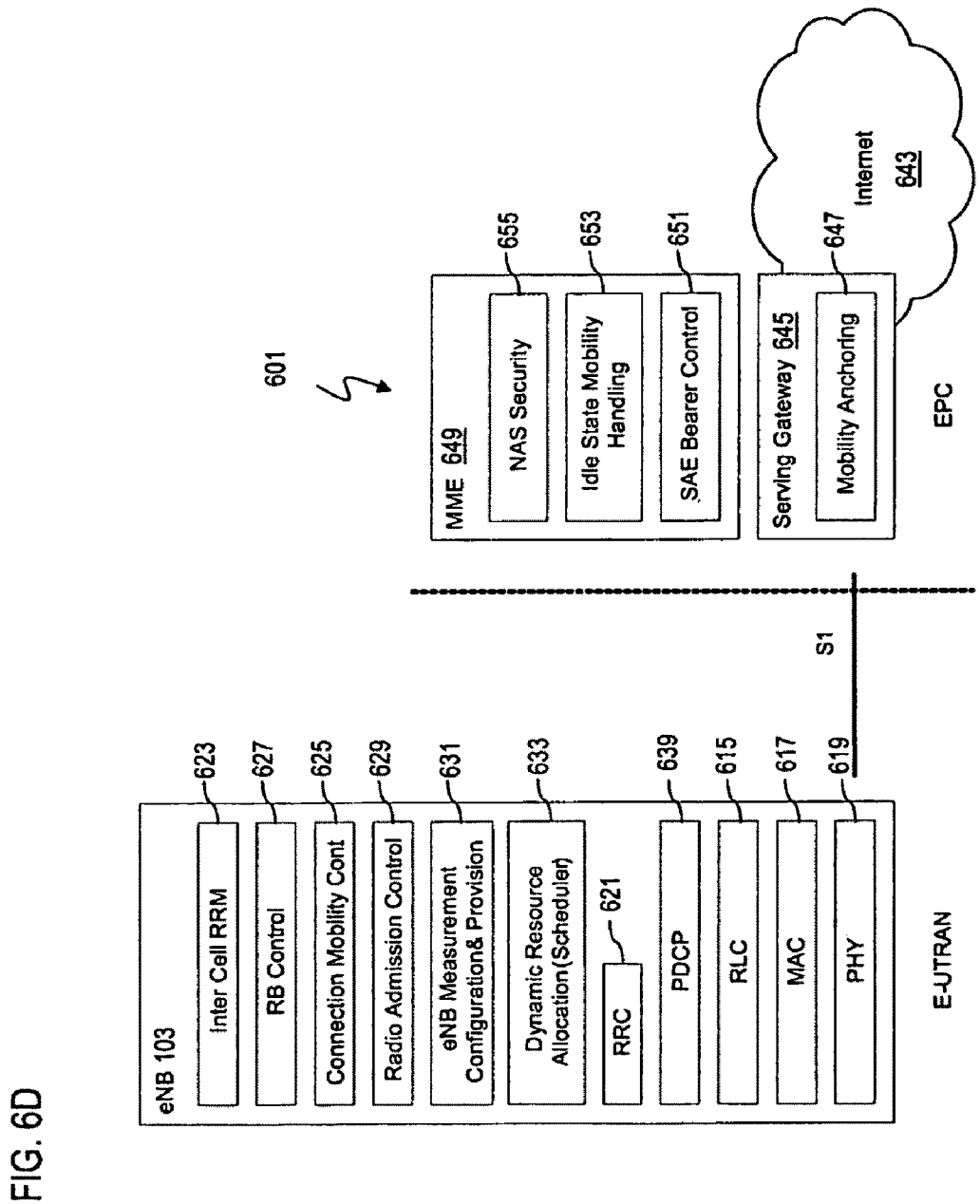

In an alternative embodiment, as shown in FIG. 6D, the PDCP (Packet Data Convergence Protocol) functionality can reside in the eNB 103 rather than the GW 601. Other than this PDCP capability, the eNB functions of FIG. 6C are also provided in this architecture.

In the system of FIG. 6D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 103 interfaces via the S1 to the Serving Gateway 645, which includes a Mobility Anchoring function 647. According to this architecture, the MME (Mobility Management Entity) 649 provides SAE (System Architecture Evolution) Bearer Control 651, Idle State Mobility Handling 653, and NAS (Non-Access Stratum) Security 655.

Figure 7:
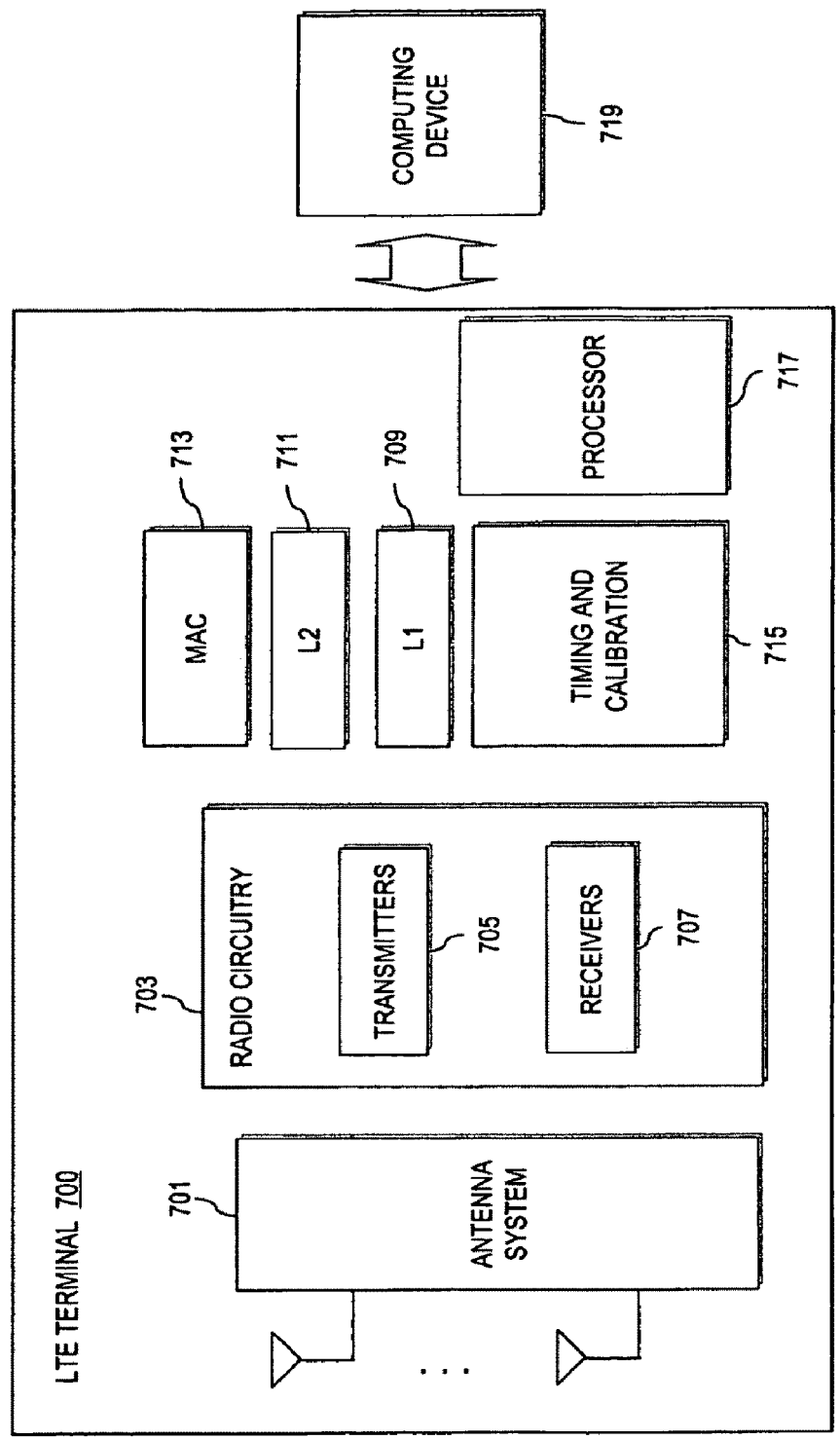
FIG. 7 is a diagram of exemplary components of an LTE terminal capable of operating in the systems of FIGS. 6A-6D, according to an embodiment of the invention.

FIG. 7 is a diagram of exemplary components of an LTE terminal capable of operating in the systems of FIGS. 6A-6D, according to an embodiment of the invention. An LTE terminal 700 is configured to operate in a Multiple Input Multiple Output (MIMO) system. Consequently, an antenna system 701 provides for multiple antennas to receive and transmit signals. The antenna system 701 is coupled to radio circuitry 703, which includes multiple transmitters 705 and receivers 707. The radio circuitry encompasses all of the Radio Frequency (RF) circuitry as well as base-band processing circuitry. As shown, layer-1 (L1) and layer-2 (L2) processing are provided by units 709 and 711, respectively. Optionally, layer-3 functions can be provided (not shown). Module 713 executes all MAC layer functions. A timing and calibration module 715 maintains proper timing by interfacing, for example, an external timing reference (not shown). Additionally, a processor 717 is included. Under this scenario, the LTE terminal 700 communicates with a computing device 719, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining whether a resource is allocated for a logical control channel; and
   defining one or more fields of a physical downlink control channel to signal the resource allocation for the logical control channel,
   wherein the physical downlink control channel includes a first format to support transmission of data over a physical downlink shared channel, and a second format including the one or more fields to support resource allocation for the logical control channel, and
   wherein the logical control channel comprises a paging control channel.

2. A method according to claim 1, wherein the logical control channel further comprises a broadcast control channel.

3. A method according to claim 2, wherein the one or more fields include one or more of a broadcast channel radio network temporary identity field, a redefined portion, or entirety of, a transport format indicator field, a value tag field to indicate a change in broadcast information, a field specifying a type of system information block, and a field for segmentation and concatenation information.

4. A method according to claim 3, wherein the one or more fields further include one or more of a redefined hybrid automatic repeat request control field, a field specifying a number of transmission symbols for time division duplex idle periods, a field specifying whether reference signal boosting is utilized, and an error detection field.

5. A method according to claim 1, wherein the one or more fields include one or more of a field specifying a user equipment identifier, a paging channel radio network temporary identity field, and a redefined portion, or entirety of, a transport format indicator field.

6. A method according to claim 5, wherein the one or more fields further include one or more of a redefined hybrid automatic repeat request control field and an error detection field.

7. A non-transitory computer-readable medium encoded with instructions that, when executed by at least one processor, perform at least the following:
   determining whether a resource is allocated for a logical control channel; and
   defining one or more fields of a physical downlink control channel to signal the resource allocation for the logical control channel,
   wherein the physical downlink control channel includes a first format to support transmission of data over a physical downlink shared channel, and a second format including the one or more fields to support resource allocation for the logical control channel, and
   wherein the logical control channel comprises a paging control channel.

8. A non-transitory computer-readable medium according to claim 7, wherein the logical control channel further comprises a broadcast control channel.

9. An apparatus comprising:
   at least one processor; and
   at least one memory including computer program code, the at least one processor, the at least one memory, and the computer program code configured to cause the apparatus to at least:
   determine whether a resource is allocated for a logical control channel; and
   define one or more fields of a physical downlink control channel to signal the resource allocation for the logical control channel,
   wherein the physical downlink control channel includes a first format to support transmission of data over a physical downlink shared channel, and a second format including the one or more fields to support resource allocation for the logical control channel, and
   wherein the logical control channel comprises a paging control channel.

10. An apparatus according to claim 9, wherein the logical control channel further comprises a broadcast control channel.

11. An apparatus according to claim 10, wherein the one or more fields include one or more of a broadcast channel radio network temporary identity field, a redefined portion, or entirety of, a transport format indicator field, a value tag field to indicate a change in broadcast information, a field specifying a type of system information block, and a field for segmentation and concatenation information.

12. An apparatus according to claim 11, wherein the one or more fields further include one or more of a redefined hybrid automatic repeat request control field, a field specifying a number of transmission symbols for time division duplex idle periods, a field specifying whether reference signal boosting is utilized, and an error detection field.

13. An apparatus according to claim 9, wherein the one or more fields include one or more of a field specifying a user equipment identifier, a paging channel radio network temporary identity field, and a redefined portion, or entirety of, a transport format indicator field.

14. An apparatus according to claim 13, wherein the one or more fields further include one or more of a redefined hybrid automatic repeat request control field and an error detection field.

15. A method comprising:
   receiving, at a user equipment, a control message over a physical downlink control channel providing resource allocation for a logical control channel,
   wherein the control message includes a first format to provide transmission of data over a physical downlink shared channel, and a second format including one or more fields to provide resource allocation for the logical control channel, and
   wherein the logical control channel comprises a paging control channel.

16. A method according to claim 15, wherein the logical control channel further comprises a broadcast control channel.

17. A method according to claim 16, wherein the one or more fields include one or more of a broadcast channel radio network temporary identity field, a redefined portion or entirety of a transport format indicator field, a value tag field to indicate a change in broadcast information, a field specifying type of system information block, and a field for segmentation and concatenation information.

18. A method according to claim 17, further comprising:
   examining the value tag field to determine whether there is a change in the broadcast information, without decoding a corresponding physical downlink shared channel.

19. A method according to claim 17, wherein the one or more fields further include one or more of a redefined hybrid automatic repeat request control field, a field specifying number of transmission symbols for time division duplex idle periods, a field specifying whether reference signal boosting is utilized, and an error detection field.

20. A method according to claim 15, wherein the one or more fields include one or more of a field specifying a user equipment identifier, a paging channel radio network temporary identity field, and a redefined portion, or entirety of, a transport format indicator field.

21. A method according to claim 20, wherein the one or more fields further include one or more of a redefined hybrid automatic repeat request control field and an error detection field.

22. A non-transitory computer-readable medium encoded with instructions that, when executed by at least one processor, perform at least the following:
- receiving, at a user equipment, a control message over a physical downlink control channel providing resource allocation for a logical control channel,
- wherein the control message includes a first format to provide transmission of data over a physical downlink shared channel, and a second format including one or more fields to provide resource allocation for the logical control channel, and
- wherein the logical control channel comprises a paging control channel.

23. A non-transitory computer-readable medium according to claim 22, wherein the logical control channel further comprises a broadcast control channel.

24. An apparatus comprising:
- at least one processor; and
- at least one memory including computer program code, the at least one processor, the at least one memory, and the computer program code configured to cause the apparatus to at least:
- receive a control message over a physical control channel providing resource allocation for a logical control channel,
- wherein the control message includes a first format to provide transmission of data over a physical downlink shared channel, and a second format including one or more fields to provide resource allocation for the logical control channel, and
- wherein the logical control channel comprises a paging control channel.

25. An apparatus according to claim 24, wherein the logical control channel further comprises a broadcast control channel.

26. An apparatus according to claim 25, wherein the one or more fields further include one or more of a broadcast channel radio network temporary identity field, a redefined portion or entirety of a transport format indicator field, a value tag field to indicate a change in broadcast information, a field specifying type of system information block, and a field for segmentation and concatenation information.

27. An apparatus according to claim 26, wherein the one or more fields further include one or more of a redefined hybrid automatic repeat request control field, a field specifying number of transmission symbols for time division duplex idle periods, a field specifying whether reference signal boosting is utilized, and an error detection field.

28. An apparatus according to claim 26, wherein the value tag field is examined to determine whether there is a change in the broadcast information, without decoding a corresponding physical downlink shared channel.

29. An apparatus according to claim 24, wherein the one or more fields include one or more of a field specifying a user equipment identifier, a paging channel radio network temporary identity field, and a redefined portion, or entirety of, a transport format indicator field.

30. An apparatus according to claim 29, wherein the one or more fields further include one of more of a redefined hybrid automatic repeat request control field and an error detection field.

* * * * *